3,819,690
ACID NITRO DYESTUFFS, THEIR
MANUFACTURE AND USE
Jean Bruenisholz, Reinach, and Fabio Beffa, Riehen, Switzerland, assignors to Ciba-Geigy AG, Basel, Switzerland
No Drawing. Filed Apr. 3, 1972, Ser. No. 240,850
Claims priority, application Switzerland, Apr. 19, 1971, 5,634/71; Feb. 23, 1972, 2,619/72
Int. Cl. C07c *143/56*
U.S. Cl. 260—510                    2 Claims

ABSTRACT OF THE DISCLOSURE

Acid nitro dyestuffs of the formula

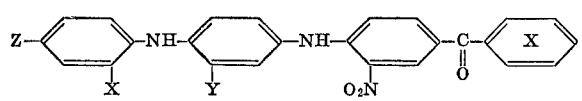

wherein the phenyl radical X is preferably substituted, in particular by chlorine and by alkyl or alkoxy groups containing from 1 to 4 carbon atoms in which one Y is an $SO_3H$ group and the other Y is hydrogen, and Z represents either hydrogen or an $NO_2$ group.

---

The present invention relates to new acid nitro dyestuffs, a process for the manufacture of these dyestuffs, their use in the dyeing and printing of organic materials, in particular polyamide materials, as well as the material which is dyed or printed using said dyestuffs.

The invention is based on the observation that valuable acid nitro dyestuffs of the formula

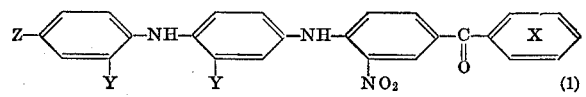

are obtained, wherein the phenyl radical X is preferably substituted, in particular by chlorine and by alkyl or alkoxy groups containing preferably from 1 to 4 carbon atoms and in which one Y is an $SO_3H$ group and the other Y is hydrogen, and Z represents either hydrogen or an $NO_2$ group, by reacting m-nitrobenzophenone compounds of the general formula

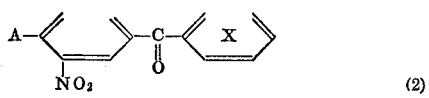

wherein the phenyl radical X has the meaning given hereinbefore and A represents a replaceable substitutent, in particular a chlorine or bromine atom or a methoxy group, with p-amino-di-phenylaminosulphonic acid of the general formula

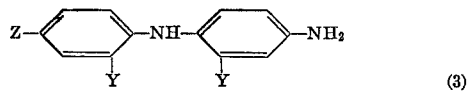

wherein Y and Z have the meanings given hereinbefore, in the presence of acid binding agents.

As examples of n-nitrobenzophenone compounds of the formula 2 which contain a replaceable substituent in the ortho-position to the nitro group there may be cited:

4-chloro-3-nitro-benzophenone,
4-chloro-3-nitro-4'-methyl-benzenophenone,
4-bromo-3-nitro-4'-methylbenzophenone,
4,4'-dichloro-3-nitro-benzophenone,
4-methoxy-3-nitro-4'-methylbenzophenone,
4-chloro-3-nitro-4'-methoxybenzophenone,
4-chloro-3-nitro-3',4'-dimethylbenzophenone,
4-chloro-3-nitro-2',4'-dimethylbenzophenone,
4-chloro-3-nitro-4'-ethylbenzophenone,
4-chloro-3-nitro-4'-propyl-benzophenone,
4-chloro-3-nitro-4'-butylbenzophenone,
4-chloro-3-nitro-4'-ethoxybenzophenone.

Suitable p-amino-diphenylaminosulphonic acids are: 4-amino-diphenylamino-2- or 2'-sulphonic acid, 4-amino-4'-nitro-diphenylamino-2- or 2'-sulphonic acid.

As acid binding agents it is posible to use, for example, ammonia, acetates, carbonates or hydroxides or oxides of alkali or alkaline earth metals, for example sodium carbonate, sodium bicarbonate, sodium acetate, magnesium oxide or the like.

The reaction is carried out in water, in suitable organic solvents or in mixtures of both, and occurs advantageously by heating under pressure or by boiling under reflux. The precipitation of the resulting dyestuff is effected by the conventional methods, for example by salting it out by adding sodium chloride.

The nitro dyestuffs of the formula I obtained in this manner produce on natural and synthetic polyamide materials in most instances yellowish brown dyeings which are distinguished by very good levelness and good general fastness properties, particularly fastness to light. In their good building up properties on and affinity for polyamide materials, the new dyestuffs are quite substantially superior to already known nitro dyestuffs, for example those obtainable according to German Pat. No. 748,824 or Swiss Pat. No. 240,226.

A particularly valuable dyestuff is the nitro dyestuff according to the invention of the formula

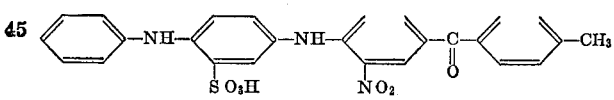

which, in its building up capacity and exhaust speed, is greatly superior to already known nitro dyestuffs, for example from French Pat. No. 913,351 (from 4'-chloro-3'-nitro-benzophenone-2-carboxylic acid) and from German Pat. No. 748,824 (from 4-chloro-3nitroacetophenone). Moreover, it displays substantially better fastness properties than the dyestuff from 4-chloro-3-nitro-acetophenone.

On account of their good building up and levelling properties and affinity, the nitro dyestuff according to the invention are very particularly suitable for dyeing or printing carpeting which consists of polyamide or a fibre mixture containing polyamide. On account of their good water-solubility, they can be used in the printing process and in the modern dyeing processes in which a relatively high concentration of the dyestuff in pastes, liquors or stock solutions is necessary, for example in spray dyeing processes for present tubular knit cloth, in the exhaust process with small liquor ratio (slop-pad process), in the continuous exhaust process (fluid-o-therm process) or in Küsster's carpet continuous process etc.

The following Examples describe the invention in more detail. The parts denote parts by weight.

EXAMPLE 1

26.4 parts of sodium aminodiphenylamino-2-sulphonate are dissolved in 200 ml. of water. A solution of 27.5 parts of 4-chloro-3-nitro-4'-methylbenzophenone in 100 ml. of ethylene glycol monomethyl ether is then added and the entire solution is heated for 12 hours to the boil. The pH of the solution is kept between 8 and 9 by dropping in an aqueous sodium carbonate solution. The dyestuff which has formed is precipitated by addition of sodium chloride, then filtered off, washed and dried. It is in the form of a brown powder which dissolves in water to give a yellowish brown colour and from an acid bath yields on natural and synthetic polyamide materials yellowish brown dyeings having very good levelness and outstanding fastness to light.

The same dyestuff is obtained by using 4-methoxy-3-nitro-4'-methylbenzophenone instead of 4-chloro-3-nitro-4'-methylbenzophenone.

Yellowish brown dyestuffs possessing similar properties are obtained by using corresponding parts by weight of 4,4'-dichloro-3-nitro-benzophenone or 4-chloro-3-nitro-4'-methoxy- or -ethoxybenzophenone instead of 27.5 parts by weight of 4-chloro-3-nitro-4'-methylbenzophenone.

EXAMPLE 2

30.9 parts of 4 - amino-4'-nitrodiphenylamino-2'-sulphonic acid are mixed with 27.5 parts of 4-chloro-3-nitro-4'-methylbenzophenone and 2 g. of MgO in 300 ml. of glycol and the whole mixture is heated for 8 hours at 110–120° C. After it has cooled, the reaction mixture is poured on water, so that the dyestuff which has formed is precipitated. This product is filtered off, washed with a 10% sodium chloride solution and dried. It is in the form of a light brown powder which dissolves in hot water to give a yellowish brown colour and from an acid dyebath gives on natural or synthetic polyamide fibres light yellowish brown dyeings of very good levelness.

EXAMPLE 3

Continuous dyeing of a nylon tufted pile carpet by the pad-steam process 2 parts of the yellowish brown dyestuff manufactured in Example 1 are dissolved in 100 parts of water by brief boiling. This solution is subsequently added to 500 parts of cold water in which there are already dissolved 3 parts of a thickening agent on the basis of locust bean flour, 5.0 parts of a coacervate forming padding auxiliary on the basis of a condensation product of a higher molecular weight fatty acid with an oxyalkylamine, 2.0 parts of crystalline monosodium phosphate and 1.0 part of crystalline disodium phosphate, and thereafter made up to 100 parts with cold water. Of this liquor, which has a pH of 5.5 to 6.5, 300% relative to the carpet weight are applied to a nylon tufted pile loomstate carpet, the carpet traveling at a speed between 4 to 8 metres per minute. The impregnated carpet is passed into a festoon steamer, where it is treated for 10 to 15 minutes with saturated steam at 98–100° C.

After washing in an open-width washer, a carpet which is uniformly dyed yellowish brown is obtained.

EXAMPLE 4

Local colouration of hanks of yarn of polyamide carpet

Hanks of nylon yarn are brought intermittently into contact in a sutable apparatus with a solution containing 6 parts of the yellowish brown dyestuff of the formula given in Example 1, 8 parts of thickening agent on the basis of locust bean flour, 5 parts of 60% acetic acid and 8 parts of coacervate forming padding auxiliary on the basis of a condensation product of a higher molecular weight fatty acid with an oxyalkylamine in 1000 parts of water. They are subsequently steamed for 5 minutes in saturated steam at 98–100° C. and rinsed with cold water. Locally coloured yarns are obtained which can be processed to tufted pile carpets.

We claim:

1. An acid nitro dyestuff of the formula

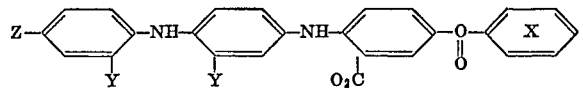

wherein the phenyl radical X is unsubstituted or substituted by a chlorine atom or by an alkyl or an alkoxy group containing from 1 to 4 carbon atoms, wherein one Y is a sulfonic acid group and the other Y is hydrogen, and wherein Z is either hydrogen or a nitro group.

2. An acid nitro dyestuff according to claim 1 of the formula

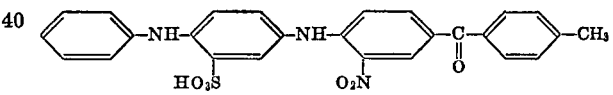

References Cited
UNITED STATES PATENTS

| | | | |
|---|---|---|---|
| 2,108,142 | 2/1938 | Ritter | 260—510 |
| 2,221,131 | 11/1949 | Fischer et al. | 260—510 |

DANIEL D. HORWITZ, Primary Examiner

U.S. Cl. X.R.

8—54, 55, 178 R

UNITED STATES PATENT OFFICE
CERTIFICATE OF CORRECTION

Patent No. 3,819,690  Dated June 25, 1974

Inventor(s) JEAN BRUENISHOLZ ET AL

It is certified that error appears in the above-identified patent and that said Letters Patent are hereby corrected as shown below:

Column 4, line 26, delete the structural formula which reads:

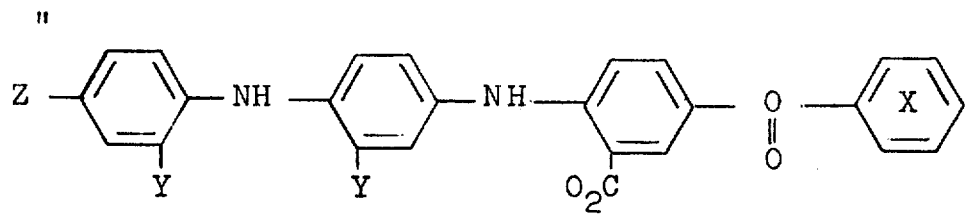

and substitute the following formula:

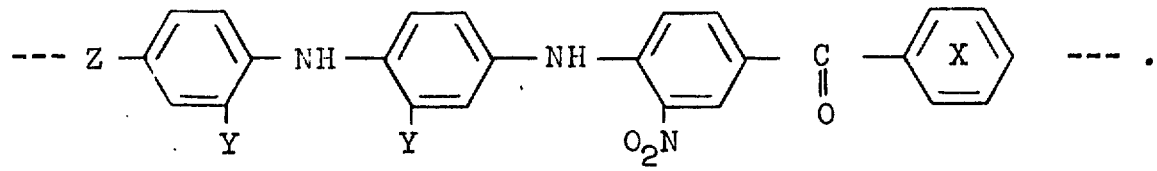

Signed and sealed this 29th day of April 1975.

(SEAL)
Attest:

RUTH C. MASON
Attesting Officer

C. MARSHALL DANN
Commissioner of Patents
and Trademarks